(12) United States Patent
Watanabe et al.

(10) Patent No.: US 11,904,454 B2
(45) Date of Patent: Feb. 20, 2024

(54) ROBOT SYSTEM AND METHOD OF CONTROLLING THE SAME

(71) Applicant: Kawasaki Jukogyo Kabushiki Kaisha, Kobe (JP)

(72) Inventors: Masayuki Watanabe, Kobe (JP); Toshihiko Miyazaki, Kobe (JP)

(73) Assignee: KAWASAKI JUKOGYO KABUSHIKI KAISHA, Kobe (JP)

( * ) Notice: Subject to any disclaimer, the term of this patent is extended or adjusted under 35 U.S.C. 154(b) by 652 days.

(21) Appl. No.: 17/105,694

(22) Filed: Nov. 27, 2020

(65) Prior Publication Data

US 2021/0078182 A1     Mar. 18, 2021

Related U.S. Application Data

(63) Continuation of application No. PCT/JP2019/021666, filed on May 31, 2019.

(30) Foreign Application Priority Data

May 31, 2018    (JP) ................................ 2018-105342

(51) Int. Cl.
     *B25J 9/00*        (2006.01)
     *B25J 13/06*      (2006.01)
                (Continued)

(52) U.S. Cl.
     CPC ............. *B25J 13/06* (2013.01); *B25J 9/1669* (2013.01); *B25J 9/1687* (2013.01);
                (Continued)

(58) Field of Classification Search
None
See application file for complete search history.

(56) References Cited

U.S. PATENT DOCUMENTS 9,535,416 B2    1/2017   Ekelund et al.
2006/0271209 A1   11/2006   Calcagno
                 (Continued)

FOREIGN PATENT DOCUMENTS

EP          0577437 B1    3/1999
JP       2003-39359 A    2/2003
              (Continued)

*Primary Examiner* — Paul B Yanchus, III
(74) *Attorney, Agent, or Firm* — XSENSUS LLP

(57) ABSTRACT

A robot system includes a manufacturing system including a robot and peripheral equipment. There is a controller communicably connected to the robot, the peripheral equipment, and a portable information terminal. The controller includes a memory storing the operation program, operation mode setting circuitry to set an operation mode a teaching mode or a playback mode, operation controlling circuitry configured to control the operation of the robot in the teaching mode based on the operation command, and control the robot and the peripheral equipment in the playback mode in accordance with the operation program, and display controlling circuitry configured to control the portable information terminal in the teaching mode to display on a display an operation screen through which the operation command is inputted, and control the portable information terminal in the playback mode to display on the displaying part a screen different from the operation screen.

8 Claims, 7 Drawing Sheets

(51) Int. Cl.
  *B25J 9/16* (2006.01)
  *G05B 19/4155* (2006.01)
  *G06F 3/14* (2006.01)

(52) U.S. Cl.
  CPC ........... *G05B 19/4155* (2013.01); *G06F 3/14* (2013.01); *B25J 9/1682* (2013.01); *G05B 2219/50391* (2013.01)

(56) References Cited

U.S. PATENT DOCUMENTS

| | | | |
|---|---|---|---|
| 2015/0352718 A1* | 12/2015 | Lee | B25J 9/0084 |
| | | | 901/3 |
| 2016/0082593 A1 | 3/2016 | Inagaki et al. | |
| 2017/0277224 A1 | 9/2017 | Mizushi et al. | |
| 2018/0370043 A1 | 12/2018 | Hashimoto et al. | |
| 2019/0019719 A1* | 1/2019 | Atwood | H01L 21/67196 |
| 2021/0236207 A1* | 8/2021 | Stanton | A61B 34/74 |

FOREIGN PATENT DOCUMENTS

| | | |
|---|---|---|
| JP | 2016-60018 A | 4/2016 |
| JP | 2016-64448 A | 4/2016 |
| JP | 2016-112651 A | 6/2016 |
| WO | 2016/113909 A1 | 7/2016 |
| WO | 2017/085897 A1 | 5/2017 |

\* cited by examiner

ROBOT SYSTEM AND METHOD OF CONTROLLING THE SAME

CROSS-REFERENCES TO RELATED APPLICATIONS

The present application is a bypass continuation of PCT filing PCT/JP2019/021666, filed May 31, 2019, which claims priority to JP 2018-105342, filed May 31, 2018, both of which are incorporated herein by reference.

TECHNICAL FIELD

The present disclosure relates to a robot system and a method of controlling the robot system.

BACKGROUND ART

Conventionally, robot operating devices for operating a robot are known. A robot operating device can include a portable smart device including a touch-panel for display and input, and a base which is grippable with one hand and includes a placing part for detachably placing the smart device thereon so that the touch-panel is exposed.

DESCRIPTION OF THE DISCLOSURE

Summary of the Disclosure

A robot system according to one aspect of the present disclosure includes a manufacturing system including a robot and a peripheral equipment configured to operate cooperatively with the robot, and configured to manufacture a product by operating in accordance with an operation program including contents and processes of the operations of the robot and the peripheral equipment, a portable information terminal including a display to display information, and inputting circuitry configured to accept an operation command for operating the robot, a cradle including a holder configured to hold the portable information terminal, a holding state detector configured to detect whether the portable information terminal is held by the holder, and a controller communicably connected to the robot, the peripheral equipment, and the portable information terminal. The controller includes a memory for storing the operation program, operation mode setting circuitry configured to set an operation mode to one of a plurality of operation modes including a teaching mode and a playback mode, operation controlling circuitry configured to control the operation of the robot in the teaching mode based on the operation command, and control the robot and the peripheral equipment in the playback mode in accordance with the operation program, and display controlling circuitry configured to control the portable information terminal in the teaching mode to display on the display an operation screen through which the operation command is inputted, and control the portable information terminal in the playback mode to display on the display a screen different from the operation screen. When the controller determines, based on a detection result of the holding state detector, that a state in which the portable information terminal is held by the holder changes to a state in which the portable information terminal is not held by the holder, the operation mode setting circuitry sets the operation mode to the teaching mode.

MODES FOR CARRYING OUT THE DISCLOSURE

Figure 1:
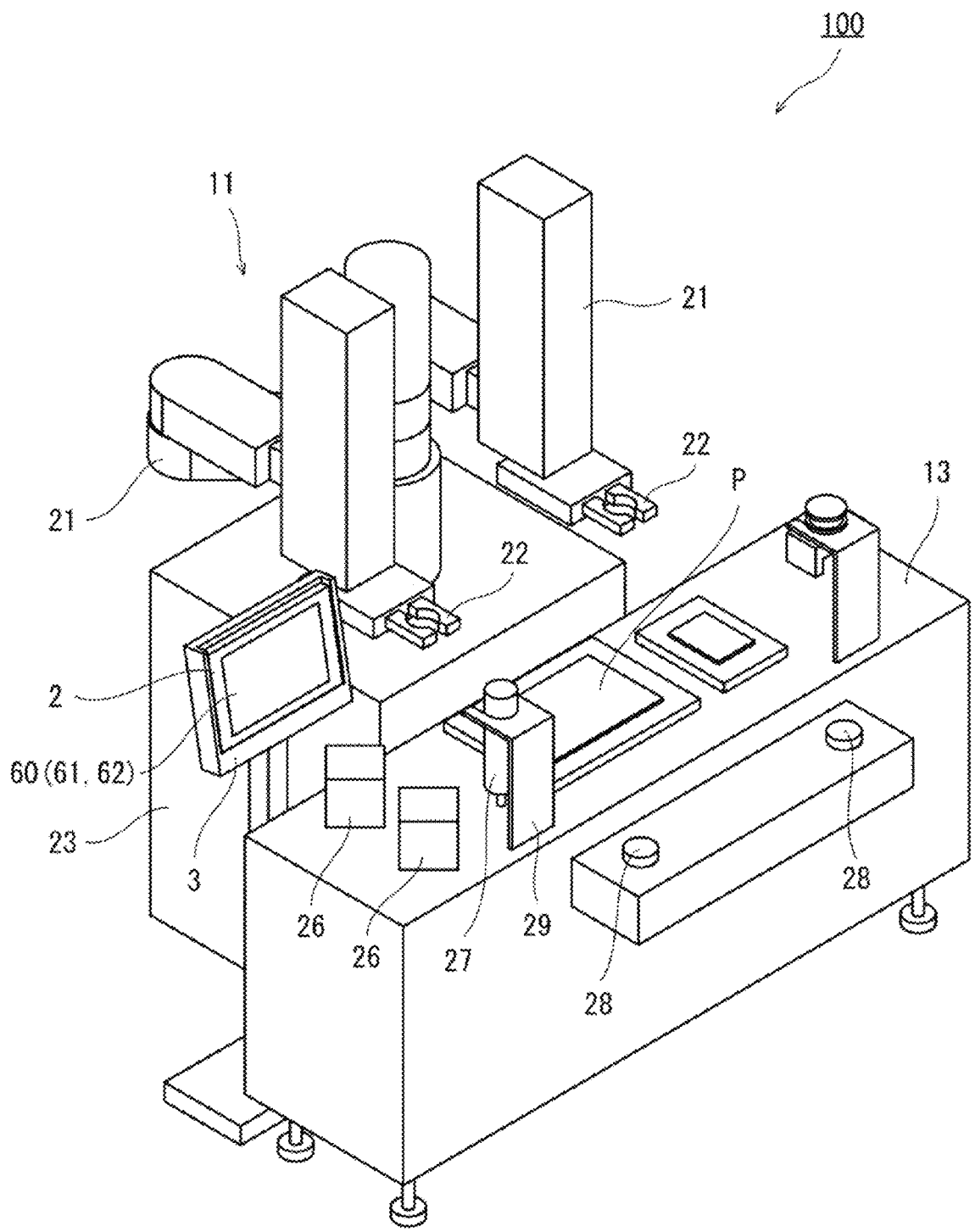
FIG. 1 is a perspective view illustrating a configuration example of a robot system according to Embodiment 1.

Hereinafter, embodiments are described with reference to the drawings. Note that the present disclosure is not limited to the embodiments described below. Moreover, the same reference characters are given to the same or corresponding components throughout the drawings to omit redundant description.

Embodiment 1

Figure 2:
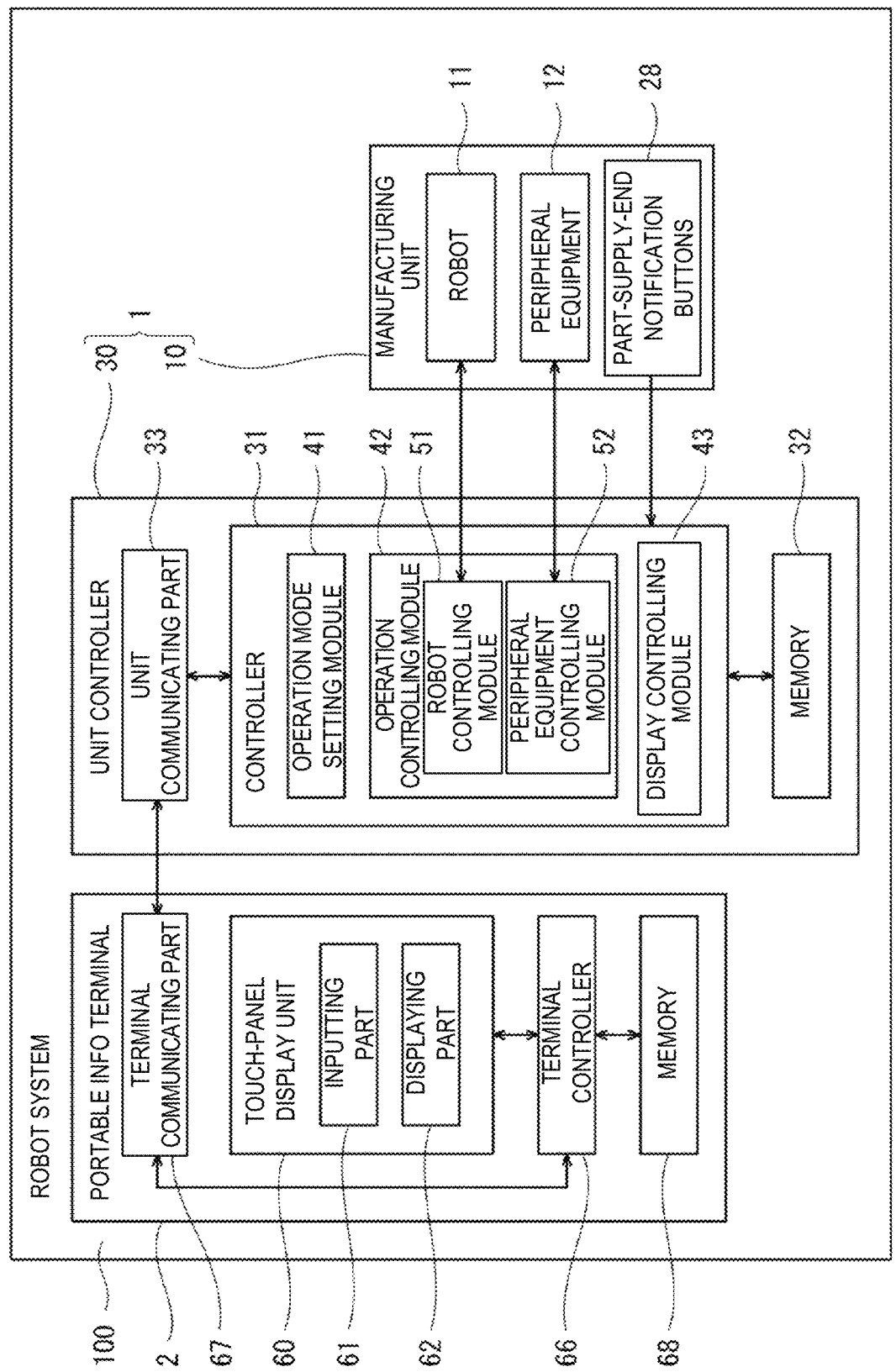
FIG. 2 is a block diagram of a configuration example of a control system of the robot system illustrated in FIG. 1.

FIG. 1 is a perspective view illustrating a configuration example of a robot system 100 according to Embodiment 1. FIG. 2 is a block diagram schematically illustrating a configuration example of a control system of the robot system 100.

The robot system 100 is applicable to, for example, a production system adopting a cell production system in which a manufacturing cell is created for each process. The cell production system is a production system in which, in an assembling process, one or more worker(s) take(s) charge of the entire process of assembling the parts. Such a cell production system is easy to switch production items, and thus, suitable for a high-mix low-volume production. Below, one example is described in detail, in which the robot system 100 is applied to a process of assembling one substrate to another substrate in a manufacturing process of an electronic device.

As illustrated in FIGS. 1 and 2, the robot system 100 is provided with a cell unit 1 in which a plurality of manufacturing equipment (a robot 11 and peripheral equipment 12 described later) are packaged as one cell unit, a portable information terminal 2, and a cradle 3.

[Configuration Example of Cell Unit 1]

The cell unit 1 is a unit packaged corresponding to the use. In this embodiment, the cell unit 1 is a unit packaged as a system for tightening screws, and performs a work of tightening screws. The cell unit 1 includes a manufacturing unit 10 and a unit controller 30.

The manufacturing unit 10 includes the robot 11, the peripheral equipment 12, and a workbench 13, and the robot 11 and the peripheral equipment 12 perform a work of manufacturing products by operating in accordance with an operation program. The work bench 13 is a bench disposed in front of the robot 11 and on which the manufacturing work of the product is performed, and the work bench 13 includes a work area P at a center part thereof for manufacturing the product.

The robot 11 is a horizontal articulated dual-arm robot provided with a pair of robotic arms 21, and the pair of robotic arms 21 are disposed so as to have a positional relationship therebetween similar to arms of a human. Therefore, the robot 11 can easily perform the tasks ordinarily performed by a worker in a manufacturing cell. A hand 22 is provided to a distal-end part of each robotic arm 21, and the hand 22 can be positioned at an arbitrary position within an operating range of the robotic arm 21 by operating the robotic arm 21. The hand 22 holds and releases a tool of various types so as to perform the manufacturing work, task, or project using the tool. The pair of robotic arms 21 are supported by a pedestal 23. The unit controller 30 is provided in an inner space of the pedestal 23.

The peripheral equipment 12 operates in accordance with the operation program configured to cause the peripheral equipment 12 to operate in cooperation with the robot 11, and the manufacturing work, task, or project of the product is performed. In this embodiment, the peripheral equipment 12 includes a screw supplying device 26 and an electric screw driver 27.

The screw supplying device 26 is a device for supplying screws used for tightening the screws in order to assemble a substrate to another substrate. The screw supplying device 26 is disposed on the workbench 13 so as to be near the work area P of the workbench 13. The electric screw driver 27 includes a driver bit which is rotary driven based on an operation command, and can hold and release the screw supplied from the screw supplying device 26 with and from the driver bit based on the operation command. The electric screw driver 27 is placed and stored on a tool stand 29 provided near the work area P of the workbench 13 when the electric screw driver 27 is not used.

Moreover, in front of the workbench 13, a pair of part-supply-end notification buttons 28 are provided. The part-supply-end notification buttons 28 are communicably connected to the unit controller 30. When the worker places one substrate and another substrate to be assembled to the one substrate in the work area P of the workbench 13, and presses the pair of part-supply-end notification buttons 28 with both his/her hands, a signal to notify that these two substrates are placed is transmitted to the unit controller 30, and a permission to start the screw tightening work is notified to the robot system 100. Therefore, the robot system 100 and the worker can cooperatively perform the work related to the manufacturing of the product. In the manufacturing process of the product, a process which is difficult to be performed by the robot system 100 is performed by the worker, and then, by the worker pressing the part-supply-end notification buttons 28, the subsequent process which can be performed easily by the robot system 100 is performed by the robot system 100.

The unit controller 30 is communicably connected to the robot 11, the peripheral equipment 12, and the portable information terminal 2. The unit controller 30 includes a controller 31, a memory 32, and a unit communicating part 33. The unit controller 30 may be a sole control unit or controller which executes a centralized control, or a plurality of control units or controllers which execute a distributed control.

The controller 31 is comprised of a processor such as a microcontroller, a CPU, an MPU, a logic circuit, and a PLC. The controller 31 includes an operation mode setting module 41, an operation controlling module 42, and a display controlling module 43. The operation mode setting module 41, the operation controlling module 42, and the display controlling module 43 are functional blocks implemented by the controller 31 executing a given control program stored in the memory 32.

The operation mode setting module 41 sets an operation mode to one of a plurality of operation modes including a teaching mode and a playback mode. The robot 11 is a robot controlled based on a teaching/playback system. In the teaching mode, a content and a process of the operation of the robot 11 are created and adjusted while the robot 11 is moved based on an operation command inputted manually by the worker, and an operation program including the information on the operation content and process of the robot 11 is created and edited. Moreover, in the teaching mode, in order for the peripheral equipment 12 to cooperatively operate with the robot 11, contents and processes of the operations of the robot 11 and the peripheral equipment 12 may be created and adjusted, and an operation program including the information on the operation contents and processes of the robot 11 and the peripheral equipment 12 may be created and edited. Meanwhile, in the playback mode, the operation program is played back so that the robot 11 and the peripheral equipment 12 perform the manufacturing work, task, or project. Note that the operation contents and processes of the robot 11 and the peripheral equipment 12 may be created and adjusted in order for the peripheral equipment 12 to cooperatively operate with the robot 11, by using a terminal other than the portable information terminal 2.

In the teaching mode, the operation controlling module 42 controls the operation of the robot 11 based on the operation command inputted by the worker through an inputting part 61 of the portable information terminal 2 so as to sequentially execute the operation command. Moreover, in the playback mode, the operation controlling module 42 controls the robot 11 and the periphery equipment 12 in accordance with the operation program stored in the memory 32. That is, the operation controlling module 42 executes a sequential control of the robot 11 and the peripheral equipment 12 in the playback mode. In this embodiment, the operation controlling module 42 includes a robot controlling module 51 for controlling the operation of the robot 11, and a peripheral equipment controlling module 52 for controlling the operation of the peripheral equipment 12. By the robot controlling module 51 and the peripheral equipment controlling module 52 operating cooperatively, collaborative operation of the robot 11 and the peripheral equipment 12 can be achieved. In this embodiment, the robot controlling module 51 and the peripheral equipment controlling module 52 are included in single control unit.

For example, the robot controlling module 51 and the peripheral equipment controlling module 52 operate cooperatively as described below, when they control cooperative operation of the robot 11 and the electric screw driver 27 in an order of an operation by the robot 11 to position the electric screw driver 27 at a first tightening position, an operation by the electric screw driver 27 to tighten the screw, and an operation by the robot 11 to position the electric screw driver 27 at a second (subsequent) tightening position. First, the robot controlling module 51 controls the robotic arm 21 in accordance with the operation program so as to position the electric screw driver 27 held by the hand 22 at the first tightening position. Then, the robot controlling module 51 notifies to the peripheral equipment controlling module 52 that the electric screw driver 27 is positioned at the first tightening position, and then, the robot controlling module 51 becomes in a stand-by state. Next, the peripheral equipment controlling module 52 which received the notification controls the electric screw driver 27 in accordance with the operation program so as to carry out the screw tightening operation. Then, when the tightening of the screw is finished, the peripheral equipment controlling module 52 notifies to the robot controlling module 51 that the tightening of the screw is finished. Next, the robot controlling module 51 which received the notification cancels the standby state, and controls the robotic arm 21 in accordance with the operation program so as to position the electric screw driver 27 held by the hand 22 at the second tightening position.

In the teaching mode, the display controlling module 43 controls the portable information terminal 2 to display an operation screen 53 (see FIG. 3) for inputting the operation command on a displaying part 62 (described later) of the portable information terminal 2. Moreover, in the playback mode, the display controlling module 43 controls the portable information terminal 2 to display a screen different from the operation screen 53. In this embodiment, the display controlling module 43 controls the portable information terminal 2 in the playback mode to display on the displaying part 62 a manufacturing information displaying screen 54 (see FIG. 4) showing information on the manufacturing of the product. For example, the display controlling module 43 transmits the operation mode set by the operation mode setting module 41 to the portable information terminal 2 to control the portable information terminal 2.

The memory 32 includes a memory such as a ROM and a RAM. The memory 32 stores given programs, and by the controller 31 reading and executing the programs, various processing are executed. The given programs include the operation contents and processes of the robot 11 and the peripheral equipment 12. Note that the memory 32 stores a plurality of operation programs corresponding to various types of products so that the robot system 100 can perform manufacturing tasks or projects of a plurality of types of products. Then, by the worker selecting the type of product to be manufactured, the operation program corresponding to this type is read from the memory 32.

The unit communicating part 33 performs wireless communication with a terminal communicating part 67 (described later) of the portable information terminal 2. The controller 31 controls the unit communicating part 33 to transmit information including a manufacturing state of the product to the portable information terminal 2.

[Configuration Example of Portable Information Terminal 2]

As illustrated in FIGS. 1 and 2, the portable information terminal 2 is a tablet computer, for example. The portable information terminal 2 includes a touch-panel display unit 60 having the inputting part 61 and the displaying part 62, a terminal-side charging connector 63 (see FIG. 4), a terminal controller 66, and a memory 68. The portable information terminal 2 has a rechargeable battery, and operates using power supplied from the rechargeable battery. The rechargeable battery is charged by power supplied via the terminal-side charging connector 63 provided to the portable information terminal 2.

The touch-panel display unit 60 is integrally provided with the displaying part 62 (e.g., a liquid-crystal display) which displays an image, and the inputting part 61 which detects information of the input position input by the worker on the screen displayed on the displaying part 62, and a well-known touch-panel display unit can be used as the touch-panel display unit 60. Therefore, the worker can input the operation command to operate the robot 11 by touching the screen based on the image information displayed on the displaying part 62. The operation command is accepted by the inputting part 61.

Figure 4:
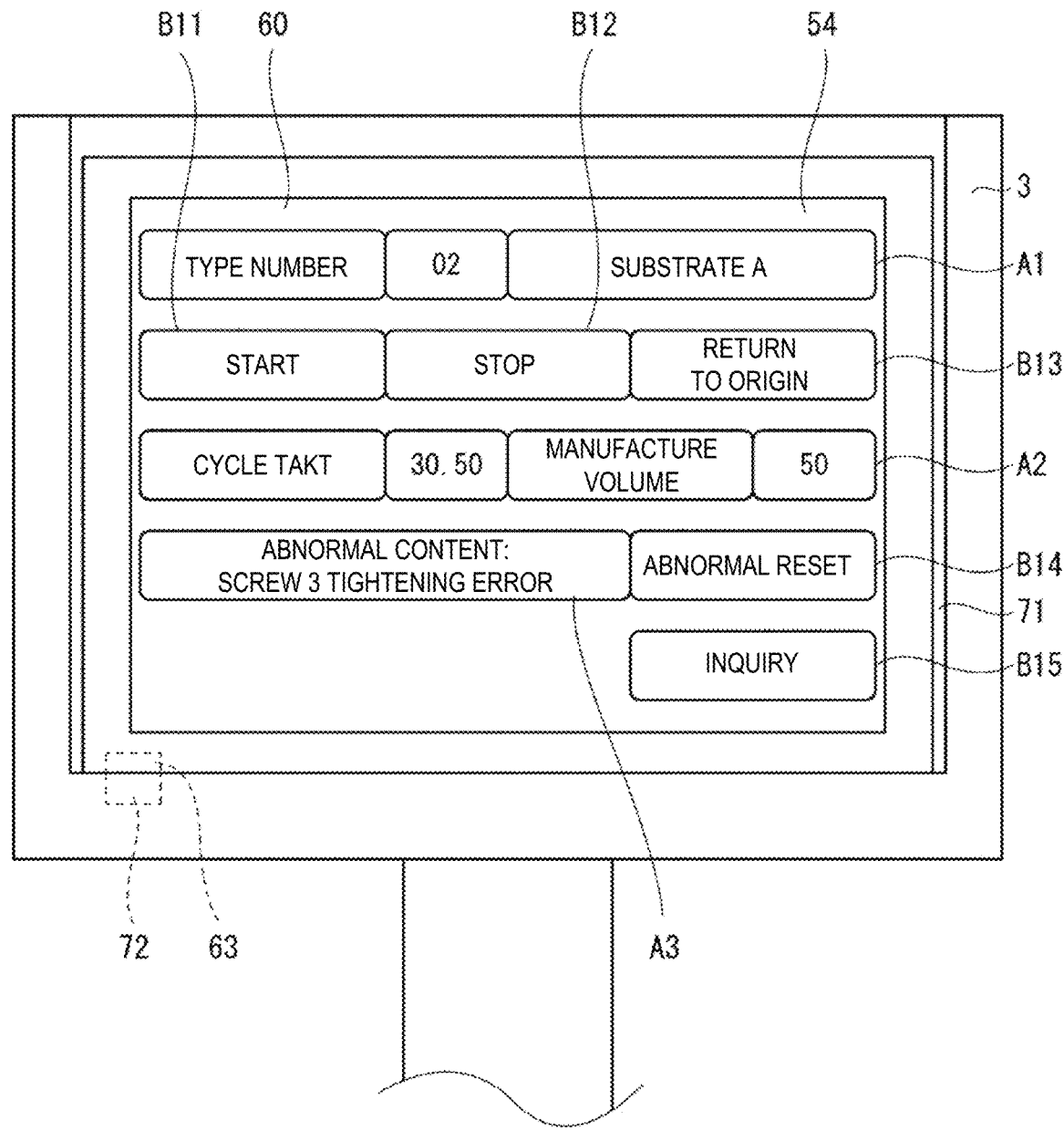
FIG. 4 is a view illustrating one example of a manufacturing information displaying screen of the robot system illustrated in FIG. 1.

As illustrated in FIGS. 1 and 4, the portable information terminal 2 is formed in a substantially rectangular shape and in a size holdable by the worker with one hand when long sides are vertically oriented. Moreover, the displaying part 62 of the touch-panel display unit 60 is also formed in a rectangular shape, and the touch-pane display unit 60 is disposed so that long sides of the displaying part 62 are oriented in the same direction as the long sides of the portable information terminal 2.

Figure 3:
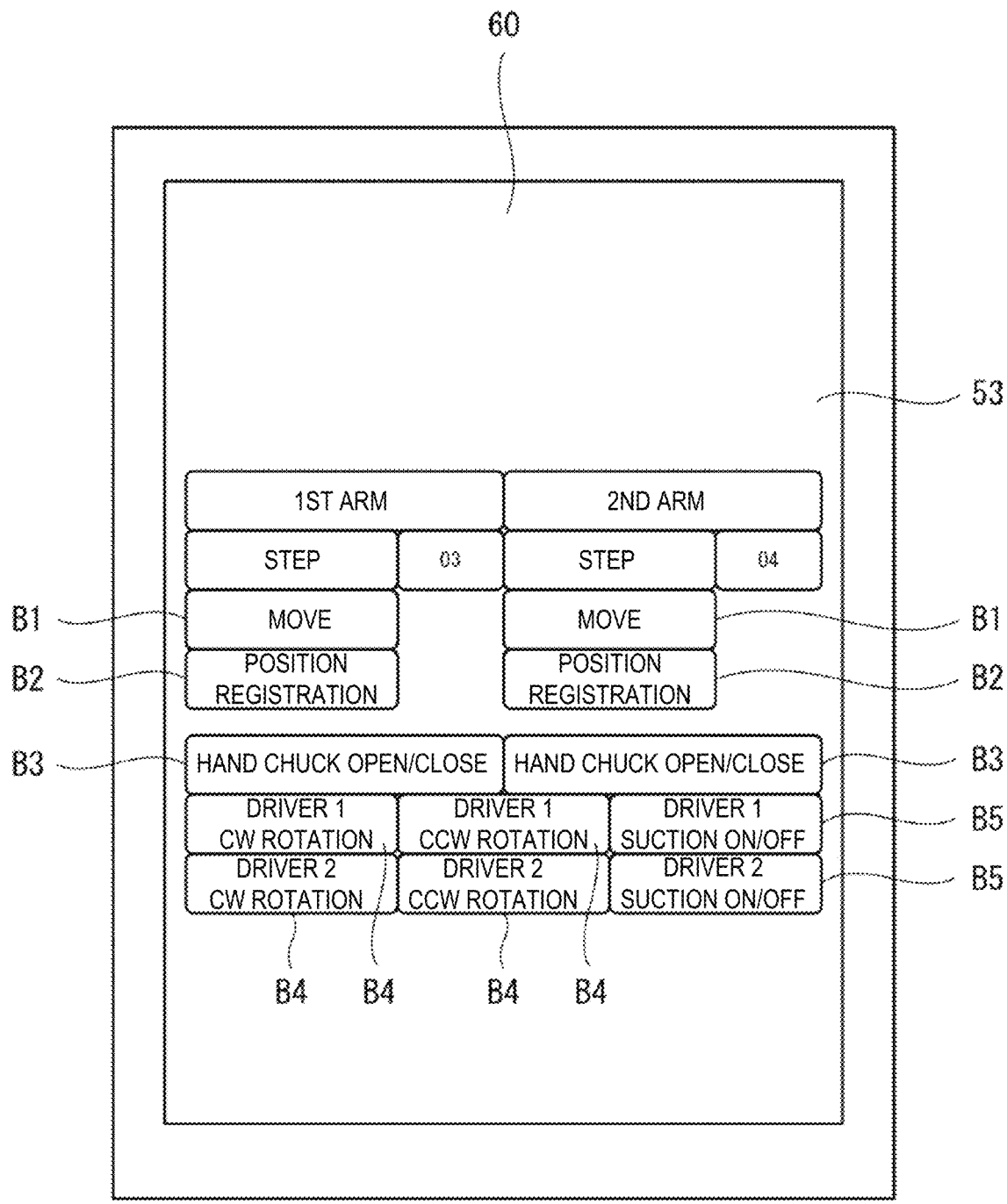
FIG. 3 is a view illustrating one example of an operation screen of the robot system illustrated in FIG. 1.

FIG. 3 is a view illustrating one example of the operation screen 53 displayed on the touch-panel display unit 60. As illustrated in FIG. 3, the operation screen 53 is a screen for inputting the operation command, and includes operation button images B1 for operating the robotic arms 21, operation button images B2 for registering teaching positions of the robotic arms 21, and operation button images B3 for operating the hands 22. Moreover, the operation screen 53 includes operation button images B4 for rotating the electric screw drivers 27 which are the peripheral equipment 12, and operation button images B5 for sucking and releasing the screws to and from the driver bits of the electric screw drivers 27. The worker touches these operation buttons in the teaching mode so as to manually operate the robot 11 and the peripheral equipment 12, and thus, the worker can create and edit the operation program including the information on the operation contents and processes of the robot 11 and the peripheral equipment 12.

Note that the operation screen 53 is an image in a portrait orientation, and is laid out so that the portable information terminal 2 and the displaying part 62 are operated in the portrait orientation. Therefore, when the worker performs the teaching work, he/she can touch the touch-panel display unit 60 using one hand while holding the portable information terminal 2 using the other hand. However, if desired, the portable information terminal 2 can be utilized in a landscape orientation.

FIG. 4 is a view illustrating one example of the manufacturing information displaying screen 54 displayed on the touch-panel display unit 60. As illustrated in FIG. 4, the manufacturing information displaying screen 54 is a screen including the information on the manufacturing of the product, and includes an area A1 where a type of the product corresponding to the operation program executed by the unit controller 30 is displayed, an area A2 where a volume of manufacture of the product being manufactured is displayed, and an area A3 where a content of an abnormality when the abnormality occurs is displayed. When the cell unit 1 operates in the playback mode, the worker can know the manufacturing state of the product through the manufacturing information displaying screen 54. Accordingly, the manufacturing information displaying screen 54 can include the information related to the manufacturing processes, the information related to the product, and the information related to the state of the manufacturing unit 10, and thus the manufacturing work can be efficiently performed. Note that the manufacturing information displaying screen 54 is an image in a landscape orientation, which can improve graspability of overall information on the manufacturing.

Note that the manufacturing information displaying screen 54 includes a start button B11 for inputting an operation command to execute the operation program, a stop button B12 for inputting an operation command to stop the execution of the operation program, and a return-to-origin button B13 for inputting an operation command to cause the robot 11 to return to the origin. A command related to the operation of the manufacturing unit 10 in the playback mode can also be inputted through the manufacturing information displaying screen 54. Moreover, an abnormal reset button B14 is provided for deleting the content of the abnormality displayed in the area A3. An inquiry button B15 is further provided for the worker to inquire the state of the robot system 100 to the robot system 100. When the worker touches the inquiry button B15, the terminal controller 66 controls the displaying part 62 to display information on the operating state of the robot system 100. Therefore, the worker can easily know by touching the inquiry button B15 whether the robot system 100 is not working in appearance since it is in a stand-by state, etc., or the robot system 100 is in the stopped state.

The terminal controller 66 is comprised of a processor such as a microcontroller, a CPU, an MPU, a logic circuit, and a PLC. The terminal controller 66 controls the displaying part 62 to display the screen corresponding to the operation mode received from the display controlling module 43 of the unit controller 30. That is, when the terminal controller 66 receives the input indicating that the operation mode is the teaching mode, it displays the operation screen 53. On the other hand, when the terminal controller 66 receives the input indicating that the operation mode is the playback mode, it displays the manufacturing information displaying screen 54. Moreover, the terminal controller 66 detects the operation command based on the content inputted to the inputting part 61.

Moreover, the portable information terminal 2 has a holding state detecting part or detector which detects whether the portable information terminal 2 is held by a holding part 71 of the cradle 3 (described later). In this embodiment, the holding state detecting part detects whether the terminal-side charging connector 63 is electrically connected to a cradle-side charging connector 72 (described later). The holding state detecting part is built in the terminal controller 66. The holding state detecting part, according to one implementation, can be implemented by software and a processor within portable information terminal 2 which detects whether there is a battery charging (whether wired or wireless) occurring within the portable information terminal 2. The software may be in the memory 68, and the processor may be the terminal controller 66. Exemplary systems which can be utilized to detect whether the portable information 2 is battering charging and/or is held by the holding part 71, and/or is connect to a cable are disclosed in U.S. Pat. Nos. 8,237,414, and 8,736,227, both of which are incorporated herein by reference. Alternatively, the holding state detecting part may be implemented in software interfacing with a charging device or the terminal-side charging connector 72 which is exterior to the portable information terminal 2. Alternatively, an electrical/mechanical switch can be utilized as the holding state detecting part and can be mounted at the cradle 3, for example.

The terminal communicating part 67 performs wireless communication with the unit communicating part 33 of the cell unit 1. This communication can be performed using a known or future WiFi standard, Bluetooth, or any desired wireless communication. Alternatively, the communication may be performed by a wired connection, such as a USB connection or a lightning connection, for example. The terminal controller 66 controls the terminal communicating part 67 to transmit to the cell unit 1 information on the holding state of the portable information terminal 2 by the cradle 3, and the information including the operation command inputted to the inputting part 61.

Note that the portable information terminal 2 may be a tablet computer possessed by the worker, and an application provided with a function to control the cell unit 1 may be installed in the tablet computer. Accordingly, the configuration of the robot system 100 can be simplified, which is advantageous for the manufacturing, and can lower a manufacturing cost.

The memory 68 is configured similarly to the memory 32. The memory 68 stores a display program for generating the operation screen 53 and the manufacturing information displaying screen 54. The terminal controller 66 uses this display program and parameters related to the manufacturing information of the product received from the unit controller 30 in order to generate the manufacturing information displaying screen 54.

[Configuration Example of Cradle 3]

As illustrated in FIG. 1, the cradle 3 is a device for placing the portable information terminal 2 at a position easy to be seen by the worker in the manufacturing cell. For example, the portable information terminal 2 is placed near a position where the worker stands in order to press the part-supply-end notification buttons 28.

The cradle 3 includes, for example, the holding part 71 which can hold the portable information terminal 2 in the landscape orientation. Alternatively, the holding part 71 can hold the portable information terminal 2 in the portrait orientation if desired. Moreover, the cradle 3 includes the cradle-side charging connector 72 connectable with the terminal-side charging connector 63 to charge the portable information terminal 2 held by the holding part 71.

[Operation Example]

Next, an operation example of the robot system 100 is described.

Figure 5:
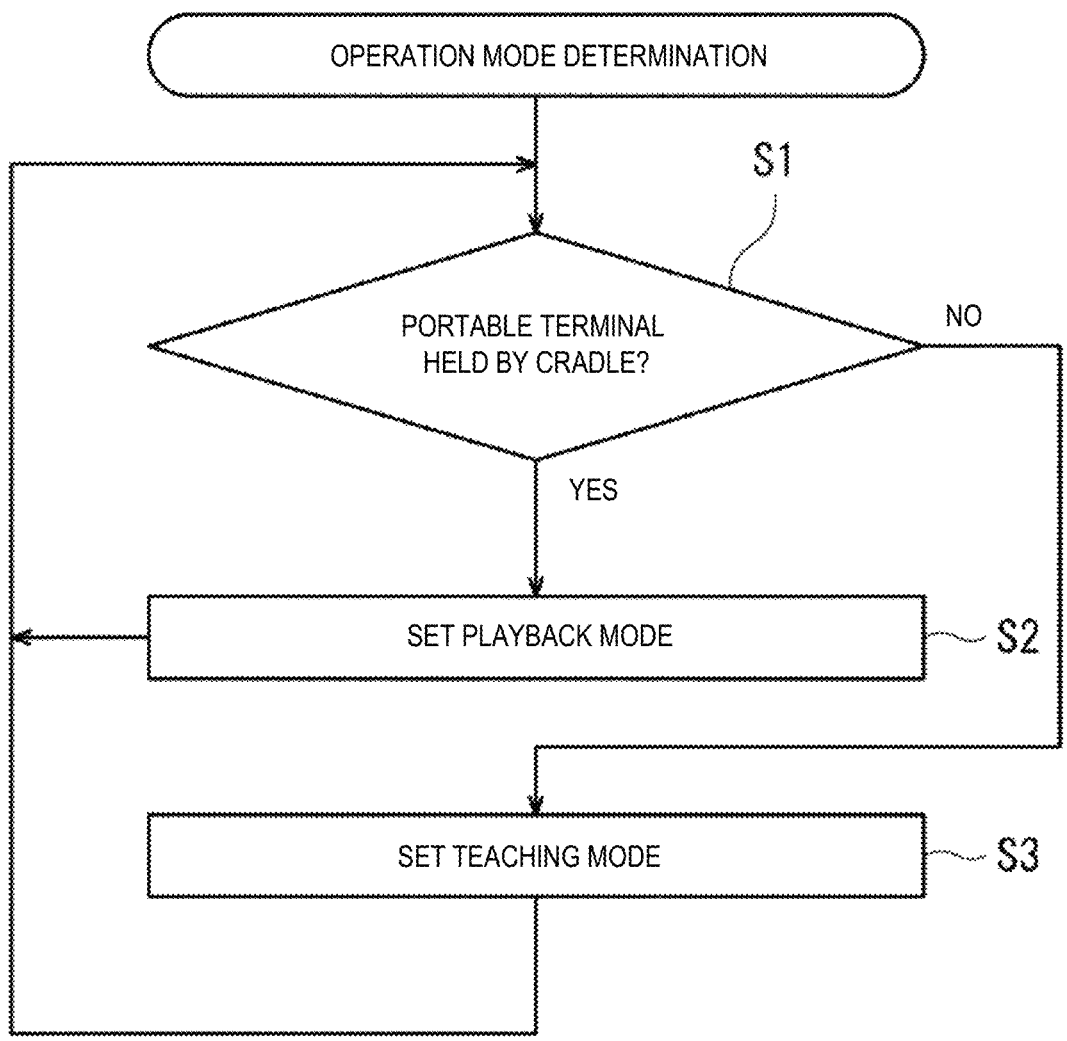
FIG. 5 is a flowchart illustrating an operation example of a determining process in an operation mode of the robot system illustrated in FIG. 1.

FIG. 5 is a flowchart illustrating an operation example of a determining process of the operation mode.

First, the controller 31 determines whether the portable information terminal 2 is held by the holding part 71 of the cradle 3 based on the detection result of the holding state detecting part, which is received from the portable information terminal 2 (Step S1).

Then, when the holding state detecting part detects that the terminal-side charging connector 63 and the cradle-side charging connector 72 are electrically connected to each other, the controller 31 determines that the portable information terminal 2 is held by the holding part 71 (YES at Step S), and the operation mode setting module 41 sets the operation mode to the playback mode (Step S2). Therefore, the operation controlling module 42 controls the robot 11 and the peripheral equipment 12 in accordance with the operation program stored in the memory 32. Note that actual operation of the robot 11 and the peripheral equipment 12 may be started after an operation command to start the operation of the robot 11 and the peripheral equipment 12 in accordance with the operation program is inputted to the inputting part 61. Moreover, the display controlling module 43 controls the portable information terminal 2 to display on the displaying part 62 of the portable information terminal 2 the manufacturing information displaying screen 54 for displaying the manufacturing information of the product. Then, the controller 31 again executes Step S1.

As described above, in the playback mode where the portable information terminal 2 is held by the cradle 3, since the terminal-side charging connector 63 of the portable information terminal 2 is connected to the cradle-side charging connector 72 so as to be charged, running out of the battery can be prevented.

Then, when the holding state detecting part detects that the connection between the terminal-side charging connector 63 and the cradle-side charging connector 72 is cancelled, the controller 31 determines that the portable information terminal 2 is not held by the holding part 71 (NO at Step S1), and the operation mode setting module 41 sets the operation mode to the teaching mode (Step S3). That is, when the holding state detecting part detects that the electrical connection between the terminal-side charging connector 63 and the cradle-side charging connector 72 is cancelled, for example, by the worker taking up the portable information terminal 2 held by the cradle 3, the unit controller 30 determines that the state where the portable information terminal 2 is held by the holding part 71 changes or transits to the state where it is not held by the holding part 71, and thus, the operation mode setting module 41 sets the operation mode to the teaching mode. Therefore, the teaching can be started promptly. Then, the operation controlling module 42 controls the operation of the robot 11 based on the operation command inputted manually by the worker. Moreover, the display controlling module 43 controls the portable information terminal 2 to display on the displaying part 62 of the portable information terminal 2 the operation screen 53 for inputting the operation command. Men, the controller 31 again executes Step S1.

Moreover, corresponding to the setting to the teaching mode, the operation controlling module 42 suspends the control of the robot 11 and the peripheral equipment 12 in accordance with the operation program, and sequentially controls the operation of the robot 11 based on the operation command inputted manually by the worker. Thus, for example, in a state where the operation command is not given immediately after the worker takes up the portable information terminal 2 held by the cradle 3, the manufacturing unit 10 stops. That is, in an emergency, the manufacturing unit 10 can be emergently stopped by taking up the portable information terminal 2 from the cradle 3.

Then, the worker takes up the portable information terminal 2 from the cradle 3, grips the portable information terminal 2 in the portrait orientation with one hand, and stands at an arbitrary position around the robot 11 so as to teach the robot 11. Therefore, the worker can teach the robot 11 while watching it from a position easy to see the operation of the robot 11, and thereby, the teaching can be performed efficiently.

Moreover, conventionally, a teach pendant for teaching a robot is not used in the playback mode, and is, for example, suspended from a housing of a robot controller. Furthermore, information on manufacturing is displayed on a display unit of exclusive use connected to a PLC, etc. when manufacturing products. However, in this embodiment, since the portable information terminal 2 displays the manufacturing information of the product in a playback mode, the portable information terminal 2 used for the teaching in the teaching mode can be used also as a display unit for displaying the manufacturing information of the product in the playback mode. Therefore, the configuration of the robot system 100 can be simplified, and the manufacturing cost can be lowered.

As described above, the robot system 100 includes the manufacturing unit 10, the portable information terminal 2, and the unit controller 30. The manufacturing unit 10 includes the robot 11 and the peripheral equipment 12 which operates cooperatively with the robot 11, and performs the manufacturing the product by operating in accordance with the operation program including the contents and processes of the operations of the robot 11 and the peripheral equipment 12. The portable information terminal 2 includes the displaying part 62 which displays information, and the inputting part 61 which accepts the operation command for operating the robot 11. The unit controller 30 is communicably connected to the robot 11, the peripheral equipment 12, and the portable information terminal 2, and includes the memory 32 storing the operation program, the operation mode setting module 41 which sets the operation mode to one of the plurality of operation modes including the teaching mode and the playback mode, the operation controlling module 42 which controls the robot 11 in the teaching mode based on the operation command, and controls the robot 11 and the peripheral equipment 12 in the playback mode in accordance with the operation program, and the display controlling module 43 which controls the portable information terminal 2 in the teaching mode to display on the displaying part 62 the operation screen 53 through which the operation command is inputted, and controls the portable information terminal 2 in the playback mode to display on the displaying part 62 the screen different from the operation screen 53.

According to this configuration, since the portable information terminal 2 displays the manufacturing information of the product in the playback mode, the portable information terminal 2 used for the teaching in the teaching mode can be used also as the display unit for displaying the manufacturing information of the product in the playback mode. Therefore, the configuration of the robot system 100 can be simplified, and the manufacturing cost can be lowered. Moreover, the robot system 100 can be used more easily.

The screen different from the operation screen 53 may be the manufacturing information displaying screen 54 including the information on the manufacturing of the product.

According to this configuration, the worker can easily confirm the information related to the manufacturing of the product by using the portable information terminal 2.

The information on the manufacturing may be at least one of the type of the manufactured product, the volume of manufacture of the product, and the content of abnormality when the abnormality occurs.

According to this configuration, the worker can more easily confirm the information related to the manufacturing of the product by using the portable information terminal 2.

The robot system 100 may further include the cradle 3 having the holding part 71 which holds the portable information terminal 2, and the holding state detecting part which detects whether the portable information terminal 2 is held by the holding part 71. When the unit controller 30 determines, based on the detection result of the holding state detecting part, that the state in which the portable information terminal 2 is held by the holding part 71 changes or transits to the state in which it is not held, the operation mode setting module 41 may set the operation mode to the teaching mode.

According to this configuration, the teaching can be started promptly.

When it is determined based on the detection result of the holding state detecting part that the state where the portable information terminal 2 is held by the holding part 71 changes or transits to the state where it is not held, the operation controlling module 42 may suspend the control of the robot 11 and the peripheral equipment 12 in accordance with the operation program.

According to this configuration, the manufacturing unit 10 can be emergently stopped by taking up the portable information terminal 2 from the cradle 3.

Embodiment 2

Below, a configuration and operation of Embodiment 2 are described focusing on differences from Embodiment 1.

Figure 6:
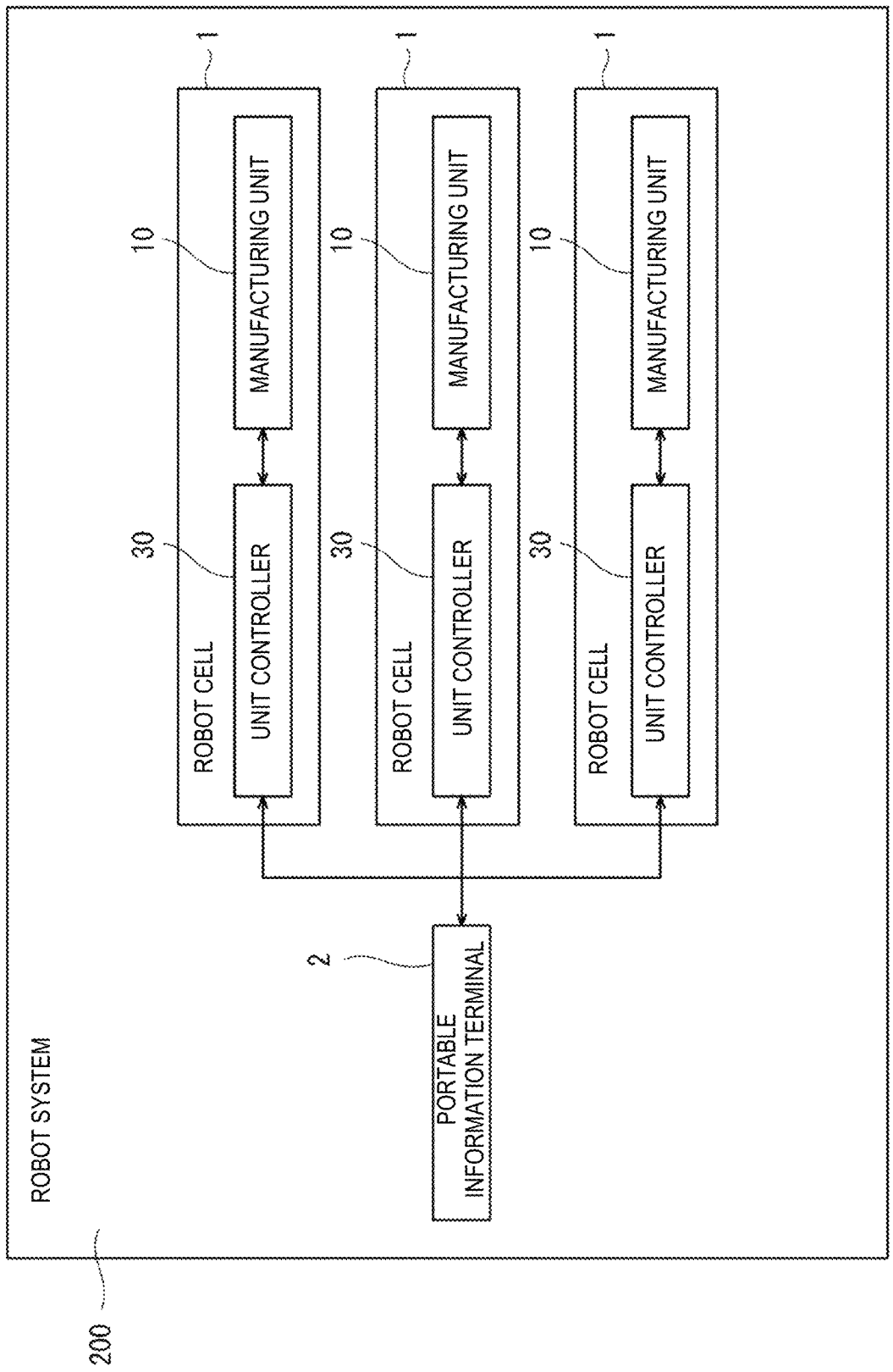
FIG. 6 is a block diagram illustrating a configuration example of a control system of a robot system according to Embodiment 2.

FIG. 6 is a block diagram schematically illustrating a configuration example of a control system of a robot system 200 according to Embodiment 2. In this embodiment, the robot system 200 includes a plurality of cell units 1.

Then, the portable information terminal 2 is communicably connected to the unit controllers 30 of the plurality of cell units 1. Therefore, the portable information terminal 2 can be shared by the plurality of cell units 1, which simplifies the configuration of the robot system 100 and lowers the manufacturing cost.

As described above, the robot system 200 may include a plurality of cell units 1 each including the manufacturing unit 10 and the unit controller 30, and configured to perform a given manufacturing work, task, or project. The portable information terminal 2 may be communicably connected to the unit controllers 30 of the plurality of cell units 1.

Embodiment 3

Below, a configuration and operation of Embodiment 3 are described focusing on differences from Embodiment 1.

Figure 7:
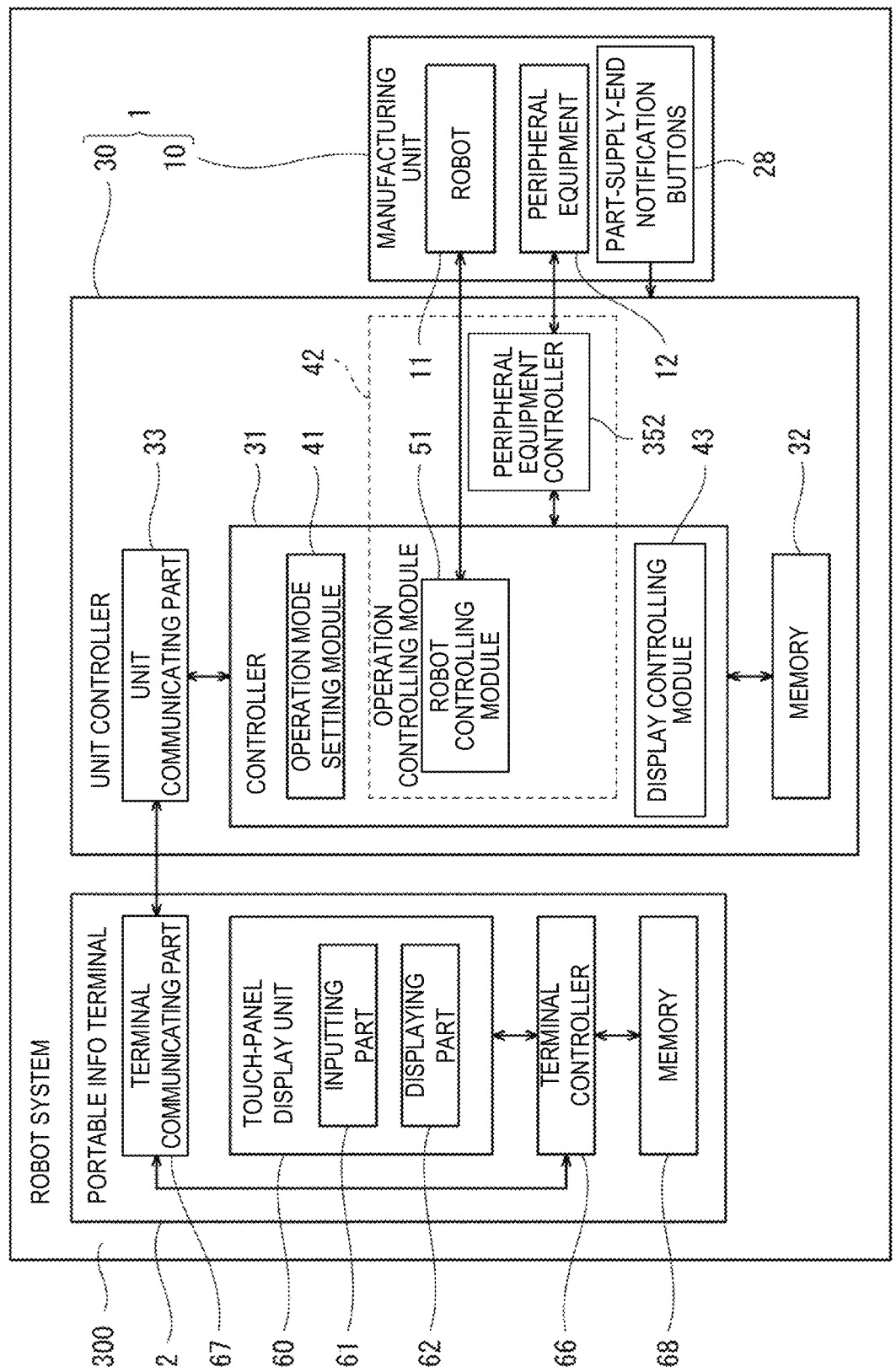
FIG. 7 is a block diagram illustrating a configuration example of a control system of a robot system according to Embodiment 3.

FIG. 7 is a block diagram schematically illustrating a configuration example of a control system of a robot system 300 according to Embodiment 3.

In this embodiment, a peripheral equipment controller 352 which controls the operation of the peripheral equipment 12 of the robot system 300 is a programmable logic controller (PLC), and is a control unit independent from the controller 31. The peripheral equipment controller 352 is communicably connected to the controller 31, and controls the peripheral equipment 12 so that the peripheral equipment 12 operates cooperatively with the robot 11. Therefore, even when an amount of communication between the peripheral equipment 12 and the control unit which controls it increases, the unit controller 30 can stably control the peripheral equipment 12 to operate cooperatively with the robot 11.

Embodiment 4

The display controlling module 43 may control the portable information terminal 2 to display a screen for guiding a method of using the robot system 100, a screen for introducing the robot system 100, and a screen for introducing the product manufactured by the robot system 100 or a service provided by the robot system 100.

Embodiment 5

The cradle 3 may be communicably connected to the unit controller 30, and an emergency stop button may be provided for transmitting a signal to emergently stop the operation of the manufacturing unit 10, to the unit controller 30.

The present disclosure achieves an effect of simplifying the configuration of the robot system.

The functionality of the elements disclosed herein including but not limited to the portable information terminal, the touch panel display unit and its inputting part and displaying part, the controllers, modules, detectors, and all other electronic and functional elements may be implemented using circuitry or processing circuitry which includes general purpose processors, special purpose processors, integrated circuits, ASICs ("Application Specific Integrated Circuits"), conventional circuitry and/or combinations thereof which are configured or programmed to perform the disclosed functionality. Processors are considered processing circuitry or circuitry as they include transistors and other circuitry therein. In the disclosure, controller, the circuitry, units, or means are hardware that carry out or are programmed to perform the recited functionality. The hardware may be any hardware disclosed herein or otherwise known which is programmed or configured to carry out the recited functionality. When the hardware is a processor which may be considered a type of circuitry, the circuitry, means, or units are a combination of hardware and software, the software being used to configure the hardware and/or processor.

According to the disclosure, since the portable information terminal displays the manufacturing information of the product in the playback mode, the portable information terminal used for the teaching in the teaching mode can be used also as a display for displaying the manufacturing information of the product in the playback mode. Therefore, the configuration of the robot system can be simplified, and the manufacturing cost can be lowered.

It is apparent for a person skilled in the art from the above description that many improvements and other embodiments of the present disclosure are possible. Therefore, the above description is to be interpreted only as illustration, and it is provided in order to teach a person skilled in the art the best mode to implement the present disclosure. The details of the structures and/or the functions may be substantially changed, without departing from the spirit of the present disclosure.

DESCRIPTION OF REFERENCE CHARACTERS

1 Cell Unit or Cell
2 Portable Information Terminal
3 Cradle
10 Manufacturing Unit or Manufacturing System
11 Robot
12 Peripheral Equipment
30 Unit Controller or Controller
31 Controller
32 Memory
41 Operation Mode Setting Module or Operation Mode Circuitry
42 Operation Controlling Module or Operation Controlling Circuitry
43 Display Controlling Module or Display Controlling Circuitry
53 Operation Screen
54 Manufacturing Information Displaying Screen
61 Inputting Part or Inputting Circuitry
62 Displaying Part or Display
66 Terminal Controller
68 Memory
71 Holding Part or Holder
100 Robot System

What is claimed is:
1. A robot system, comprising:
a manufacturing system including a robot and peripheral equipment configured to operate cooperatively with the robot, and configured to manufacture a product by operating in accordance with an operation program including contents and processes of operations of the robot and the peripheral equipment;

a portable information terminal including a display to display information, and inputting circuitry configured to accept an operation command for operating the robot;

a cradle including a holder configured to hold the portable information terminal;

a holding state detector configured to detect whether the portable information terminal is held by the holder; and a controller communicably connected to the robot, the peripheral equipment, and the portable information terminal, including:

a memory for storing the operation program;

operation mode setting circuitry configured to set an operation mode to one of a plurality of operation modes including a teaching mode and a playback mode;

operation controlling circuitry configured to control the operation of the robot in the teaching mode based on the operation command, and control the robot and the peripheral equipment in the playback mode in accordance with the operation program; and display controlling circuitry configured to control the portable information terminal in the teaching mode to display on the display an operation screen through which the operation command is inputted, and control the portable information terminal in the playback mode to display on the display a manufacturing information displaying screen, wherein:

when the display displays the operation screen during the teaching mode. the display displays the operation screen in a portrait orientation, and when the display displays the manufacturing information displaying screen during the playback mode, the display displays the manufacturing information displaying screen in a landscape orientation.

2. The robot system of claim 1, wherein the information on the manufacturing is at least one of a type of the manufactured product, a volume of manufacture of the product, and information of an abnormality when the abnormality occurs.

3. The robot system of claim 1, wherein when it is determined based on the detection result of the holding state detector that the state in which the portable information terminal is held by the holder changes to the state in which the portable information terminal is not held by the holder, the operation controlling circuitry suspends the control of the robot and the peripheral equipment in accordance with the operation program.

4. The robot system of claim 1, further comprising:

a plurality of cells each including the manufacturing system and the controller, and configured to manufacture, wherein the portable information terminal is communicably connected to the controllers of the plurality of cell.

5. A method of controlling a robot system, comprising:

determining whether a portable information terminal is held by a holder or is not held by the holder;

setting an operation mode of a robot to a teaching mode and displaying an operation screen in landscape mode, when the determining determines that the portable information terminal is not held by the holder; and setting the operation mode of the robot to a playback mode and displaying in a portrait mode, when the determining determines that the portable information terminal is held by the holder, a manufacturing information displaying screen which includes information on manufacturing of a product.

6. The method according to claim 5, further comprising:

suspending control of the robot when the determining determines that the portable information terminal is not held by the holder.

7. A non-transitory computer readable medium including computer instructions which when executed by a processor cause:

determining whether a portable information terminal is held by a holder or is not held by the holder;

setting an operation mode of a robot to a teaching mode and displaying an operation screen in landscape mode. when the determining determines that the portable information terminal is not held by the holder; and setting the operation mode of the robot to a playback mode and displaying in a portrait mode, when the determining determines that the portable information terminal is held by the holder, a manufacturing information displaying screen which includes information on manufacturing of a product.

8. The non-transitory computer readable medium accord to claim 7, further comprising computer instructions which cause:

suspending control of the robot when the determining determines that the portable information terminal is not held by the holder.

\* \* \* \* \*